US010242816B1

(12) United States Patent
Da Costa

(10) Patent No.: US 10,242,816 B1
(45) Date of Patent: Mar. 26, 2019

(54) CONTROL BOARD DRIVERS WITH POLYCARBONATE MEMBRANE

(71) Applicant: Fábio Landi Da Costa, Campinas (BR)

(72) Inventor: Fábio Landi Da Costa, Campinas (BR)

( * ) Notice: Subject to any disclaimer, the term of this patent is extended or adjusted under 35 U.S.C. 154(b) by 0 days.

(21) Appl. No.: 15/715,959

(22) Filed: Sep. 26, 2017

(51) Int. Cl.
*H02B 1/20* (2006.01)
*H01H 13/10* (2006.01)
*H01H 13/14* (2006.01)

(52) U.S. Cl.
CPC ............ *H01H 13/10* (2013.01); *H01H 13/14* (2013.01)

(58) Field of Classification Search
CPC ............................... H01H 13/10; H01H 13/14
USPC .......................................................... 361/826
See application file for complete search history.

(56) References Cited

U.S. PATENT DOCUMENTS 7,551,456 B2 * 6/2009 Behrens .................... G06F 1/18 361/600
9,153,709 B2 * 10/2015 Lin ................... H01L 31/02021
2014/0085814 A1 * 3/2014 Kielland ................... A45F 3/02 361/679.55
2014/0232546 A1 * 8/2014 Karaki ...................... G09F 9/33 340/815.45
2016/0147701 A1 * 5/2016 Kim .................... G06F 13/4221 710/313

FOREIGN PATENT DOCUMENTS

CN 204440983 * 7/2015 ............. H04B 11/18

* cited by examiner

*Primary Examiner* — Hung S. Bui
(74) *Attorney, Agent, or Firm* — Muncy, Geissler, Olds & Lowe, P.C.

(57) ABSTRACT

A control board drivers with polycarbonate membrane that includes drivers with an adhesive polycarbonate membrane and electronic circuits, with an opening for passing a connection FLET between the membrane and a SLAVE module, and a five-way cable projecting from the SLAVE module. The five-way cable has two data communication wires, two feeding wires and one spare wire that connects the SLAVE module and a MASTER module. The adhesive membrane, along with the SLAVE module and the MASTER module, allow for the replacement of all components (drivers) in an electric control board.

7 Claims, 29 Drawing Sheets

CONTROL BOARD DRIVERS WITH POLYCARBONATE MEMBRANE

FIELD OF THE INVENTION

The present invention relates to control board drivers with polycarbonate membrane suitable for use in the control and automation segment, in particular, in the electronic engineering field.

DESCRIPTION OF THE BACKGROUND ART

Generally, in order to develop and install drivers (for example, pushbuttons, selectors and signals) on the front of an electric control board, the following steps are undertaken:

Q1—Making holes according to the number of drivers on the control board door;

Q2—Blocking of the assembled drivers:

A—Visual signals (LEDs or lamps with two contact terminals);

B—Pushbuttons or buttons (dry contact with two contact terminals);

C—Selectors, two or three positions (with three or four contact terminals).

Q3—Intercalating all components according to the design:

1st—Control board perforated door;

2nd—Identification plate;

3rd—Frontal (lamps, pushbuttons and selectors);

4th—Thread for fixation of frontals;

5th—Contact base support;

6th—Drivers contact base;

These steps are shown in FIG. 1 of the present disclosure.

Further, FIG. 2 shows the set of drivers and electric connections according to another known method of installing the drivers on the electric control board. FIG. 2 shows a control board equipped with eight drivers, namely, four visual signals (A1), pushbuttons N.A (B1) and two selectors with three positions (C1).

The drivers are intercalated with a PLC (Programmable Logic Controller) or directly with contactors, as shown in FIG. 3, which displays the required connections for the drivers to work.

FIG. 4 shows a simplified electric representation, where signals (A2), pushbuttons (B2) and switches (C2) connect to a programmable logic controller (D2).

Another method used to develop electric control boards is the use of HMI (human-machine interface) (TC), where the electric drivers are replaced by a digital touch screen of the block (A4) which is directly interconnected to the contactors (B4) via wiring (1), as shown in FIG. 5.

The prior art documents require, in order to make a complete assembly (see FIG. 3) of the drivers on the block panel door (A3) with the block (B3)—CLP and power supply, making holes corresponding to the number of drivers, assembling each of the driver blocks, carrying out several electric connections individually by using cables (1), and passing the cables (1) through to inside the control board. While replacing HMI drivers with a touch screen provides certain advantages, as shown in FIG. 5, this configuration does not reduce the large number of cables to be used inside the control board.

As shown in FIG. 5, the HMI (A4) is interconnected with the cables (1), the contactors (B4) and the power supply. Accordingly, the known processes and products demand significant labor, time and materials expenditures.

With regard to published references, US Publication No.: 2012/293240, published on Nov. 22, 2012, describes a control board with membrane contact including a number of female wires disposed on the basic layer, each one with a number of electrodes electrically connected and coupled among each other, and having, each one, an opening formed on each electrode and some male wires with a number of electrodes electrically connected and coupled among each other and received and coupled to the female electrodes openings, respectively, to form a number of commutation elements; the control board with membrane contact includes a structure or configuration to be easily and quickly manufactured with reduced manufacturing costs and procedures.

Document WO2017036192, published on Mar. 9, 2017 describes a panel like control button comprising: button base (I), button panel (II), and switch plate (III) and one resilient programmable key. The button panel is fixed on the upper part of the button base, while an end of the button panel is assembled in a revolving way on one end of the button base, the switch plate is located below the button base, a pin mechanism is placed on the switch plate and the resilient programmable key is located above the commutation plate commutation mechanism. When the button panel is pressed, the button panel contacts the resilient programmable key, triggers the pin mechanism on the key plate and controls the opening and closing of the pin mechanism. The resilient programmable key provides resilience to the button panel to re-define. The panel type control button can be simultaneously applied to flat surfaces and side walls of electronic products, implementing synchronically one action of automatic replacement and having the advantage of a small space for action, total mechanical transmission and low costs.

Based on the preceding description it can be clearly observed the deficiency of the prior art with regard to a product that may facilitate the design and assembly of electric control boards without substantial number of wires used in the operation and assembly.

SUMMARY OF THE INVENTION

In view of the foregoing and other exemplary problems, drawbacks, and disadvantages of the conventional methods and systems, an exemplary feature of the present invention is to reduce assembly time and labor by replacing the required holes of drivers for a single orifice, in addition to replacing all assembly blocks of each driver for a polycarbonate membrane with electronic circuits, replacing all cables that interconnect with the drivers on the board door for a single cable with five ways, thus reducing the amount of materials used and the installation time.

BRIEF DESCRIPTION OF DRAWINGS

The present invention will become more fully understood from the detailed description given herein below and the accompanying drawings which are given by way of illustration only, and thus, do not limit the present invention, and wherein.

DETAILED DESCRIPTION OF THE INVENTION

Figure 6:
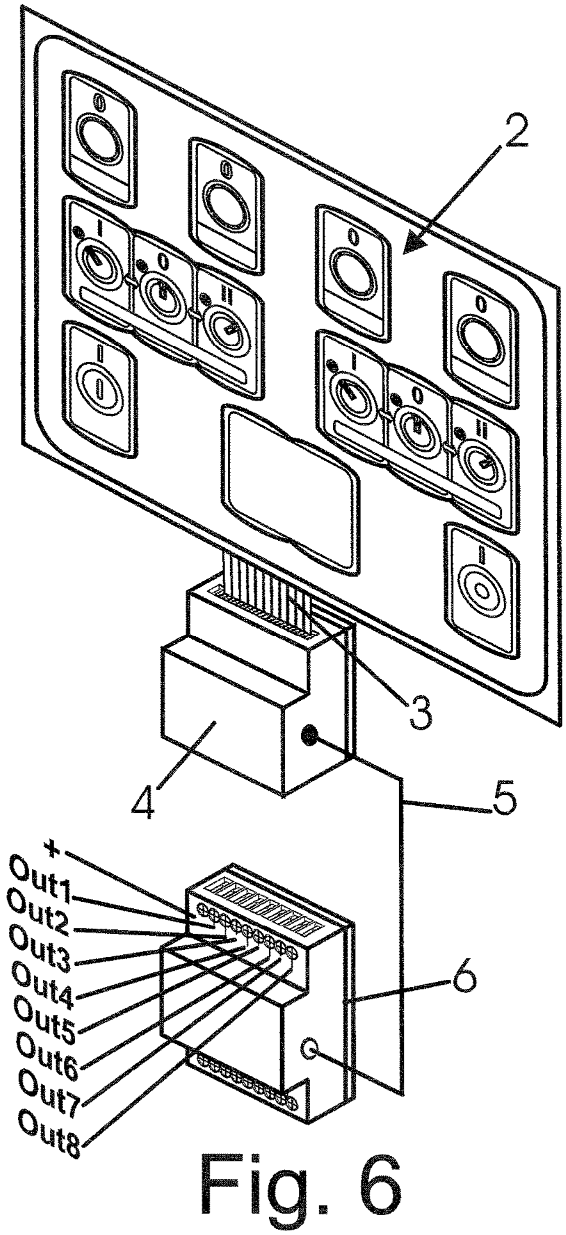
FIG. 6 shows the control board drivers with polycarbonate membrane according to an embodiment of the present invention.

The present invention is directed to control board drivers with polycarbonate membrane, comprising drivers with an adhesive polycarbonate membrane and electronic circuits, with an opening for passing a connection FLET (3) between the membrane (2) and a SLAVE module (4), and a five-way cable (5) projecting from the SLAVE module (4), wherein the five-way cable (5) comprises two data communication wires, two feeding wires and one spare wire that connects the SLAVE module (4) and a MASTER module (6). This embodiment of the present invention is shown in FIG. 6.

Figure 7:
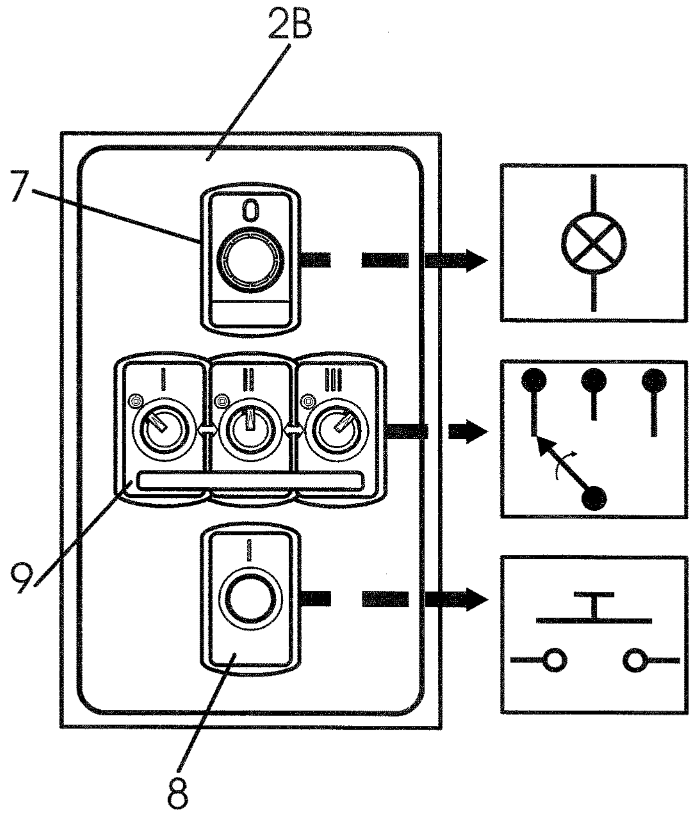
FIG. 7 shows control board drivers with polycarbonate membrane, wherein an adhesive membrane replaces all drivers required in an electric control board according to an embodiment of the present invention.

FIG. 7 shows an embodiment of the present invention, where the adhesive polycarbonate membrane (2B) replaces all drivers of the electric control board. According to FIG. 7, each membrane component (2B), for example, a visual signal (7) equipped with LEDs (light-emitting diodes) that replaces conventional lamps, N.A. pushbuttons (8) equipped with dry contact caps N.A that replace conventional buttons, and a selector with three) or two positions (9) with the same electric principle as that of the pushbuttons (8), is distinguished only for retaining one of its contacts when it is selected. Moreover, according to FIG. 7, the membrane (2B) can be made with several drivers according to the present disclosure and an electric control board designer is required for these purposes.

Figure 8:
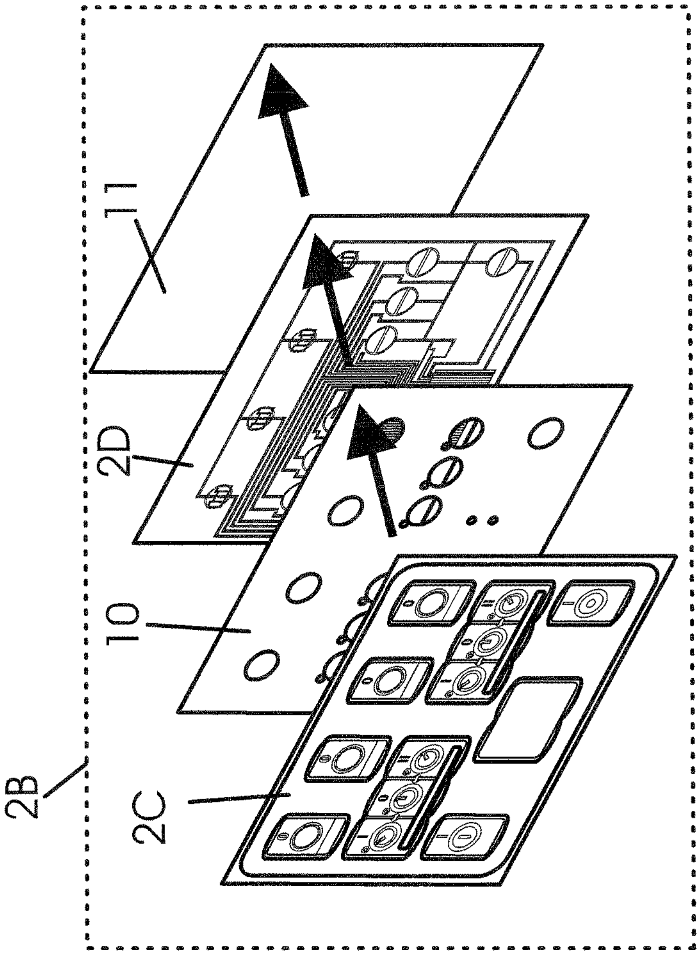
FIG. 8 shows a panel with polycarbonate membrane with its main components according to an embodiment of the present invention.

According to an embodiment of the invention, and as shown in FIG. 8, a polycarbonate membrane panel (2B) comprises an adhesive membrane with a frontal layout (drivers shape and colors) (2C), a double phase adhesive perforated according to components (10), a flexible printed circuit membrane (2D) equipped with electric contact (buttons) caps and LEDs (light emitting diodes). Additionally, the polycarbonate membrane panel (2B) may also contain a double face adhesive (11), which is used to fix the membrane keyboard on to an electric control board door.

Figure 9:
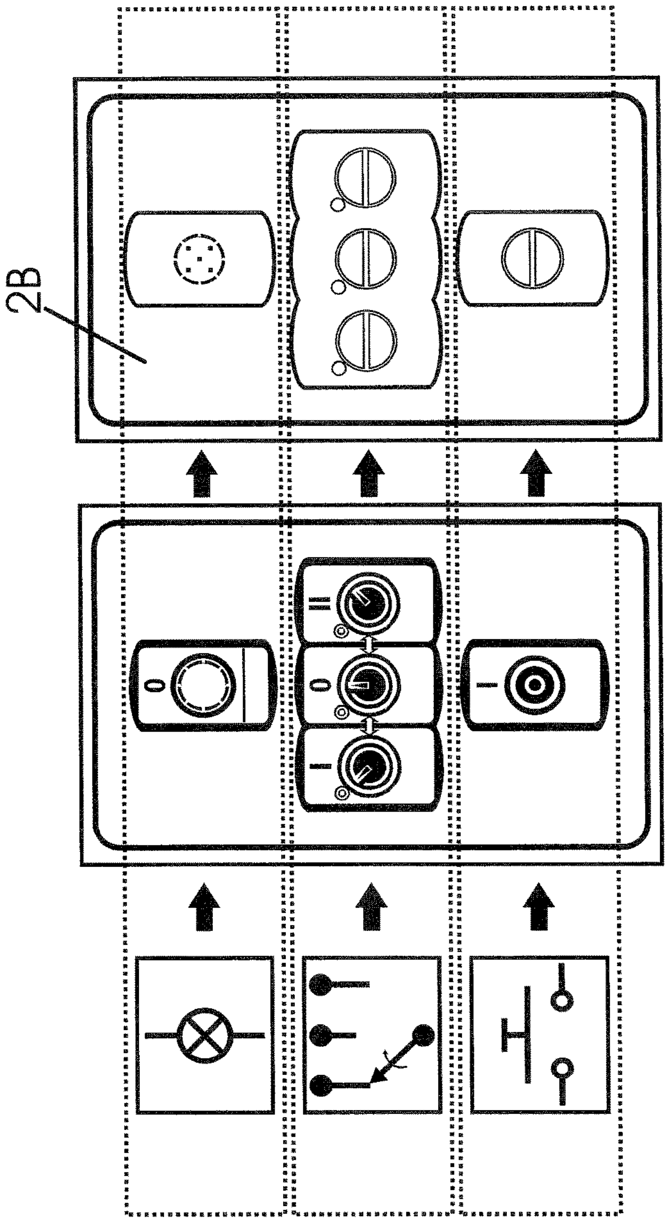
FIG. 9 shows disposing electric symbols equivalence with the polycarbonate membrane layout figures according to an embodiment of the present invention.
Figure 11:
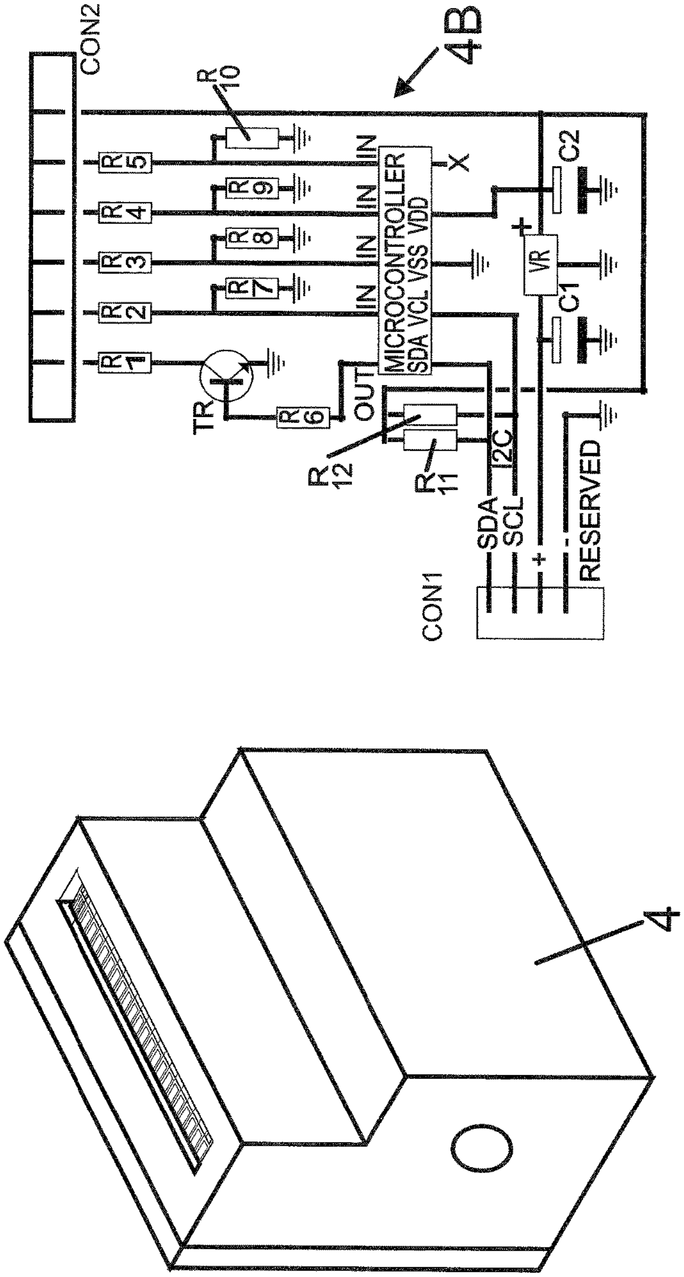
FIG. 11 shows the SLAVE module required to interconnect the previous figure membrane, equipped with electronic circuits with signal inputs and outputs compatible with the membrane according to an embodiment of the present invention.
Figure 13:
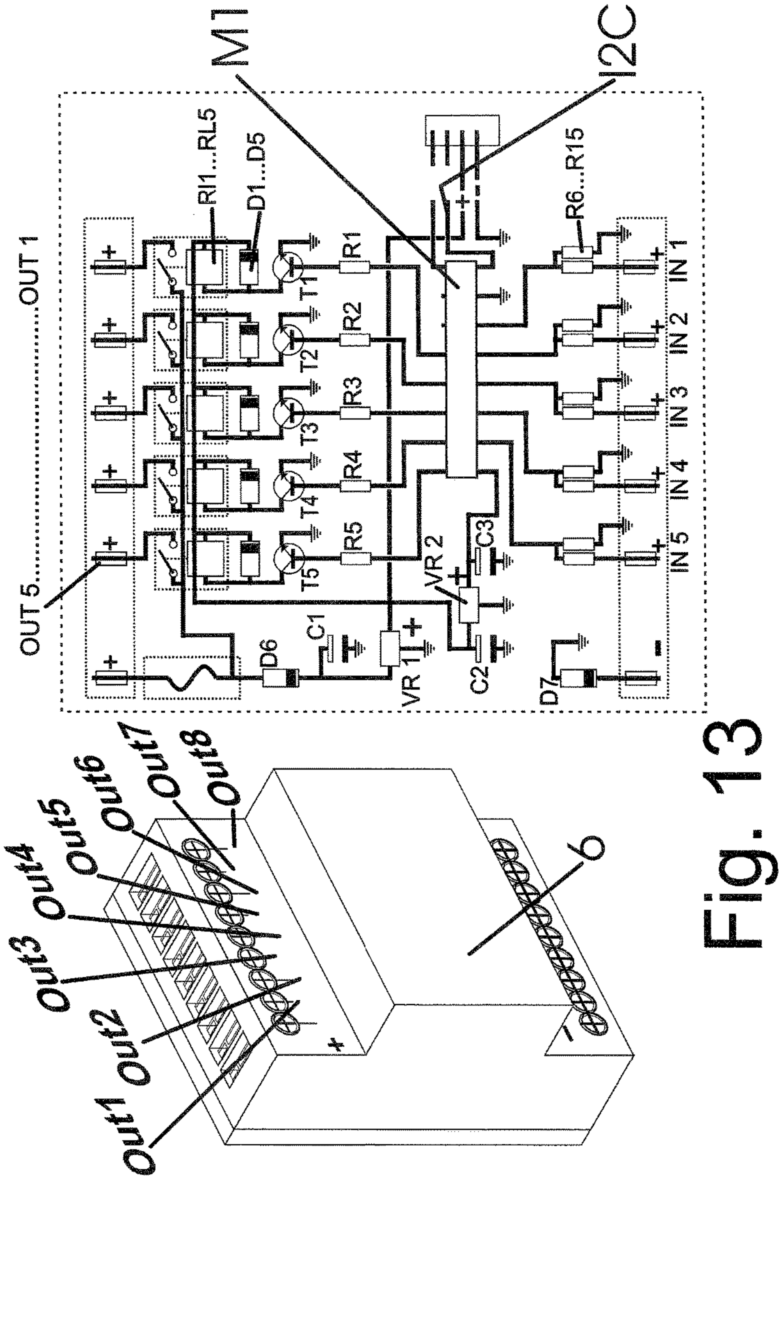
FIG. 13 is the MASTER module electro-electronic diagram according to an embodiment of the present invention.

The polycarbonate membrane panel (2B) does not count on sufficient electric characteristics to support input and output loads from a PLC (Programmable Logic Controller)

or to be directly connected to the contactors. It would not be possible to commute the buttons, which do not reduce the number of wires to be connected. Accordingly, two electronic modules were developed, "SLAVE" module (4) (as shown in FIG. 11) and "MASTER" module (6) (as shown in FIG. 13) for these functions. Thus, in FIG. 9, equivalence of electric symbols with the polycarbonate membrane layout (2B) is shown. These characteristics are described in detail below.

Figure 10:
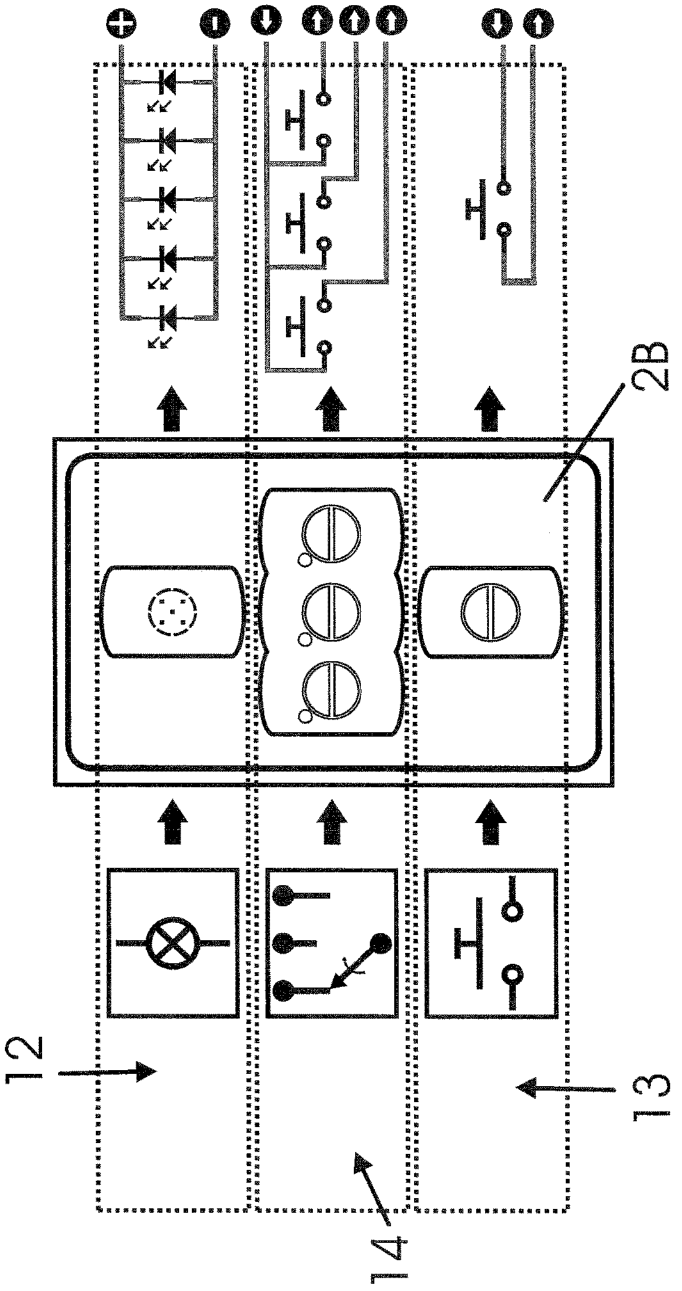
FIG. 10 shows disposing a membrane similar to a lamp, with several light-emitting diodes (LEDs), pushbutton similar to a N.A, button and a switch replaced on the membrane by three N.A. buttons with a common sign input, but with three distinct outlets according to an embodiment of the present invention.

FIG. 10 shows a lamp (12) having several LEDs (light emitting diodes) connected in parallel. The pushbutton (13) is identical to a N.A. button and has the same electrical characteristics of the membrane. In other words, when the button (13) is pressed, the input sign is sent to the output. For the switch (14) to be replaced on the membrane (2B), the connection of three N.A. buttons is made with common sign input, but with three distinct outputs. When the SLAVE module (FIG. 11) receives the pressed button signal, the SLAVE module will make the commutation logic, keeping the pressed button output in N.F and open the contacts of the remaining buttons in N.A). Accordingly, there will always be a contact with active output (N.F) like a mechanical switch. Optionally, a LED for each switch button can be provided. This set of LEDs indicates which of the switch button was pressed last.

Further, in order to interconnect the membrane shown in FIG. 10, the SLAVE module (4) is necessary (FIG. 11) to be equipped with an electronic circuit board (4B) containing inputs and outputs of signals compatible with the membrane, as shown in FIG. 11.

Figure 12:
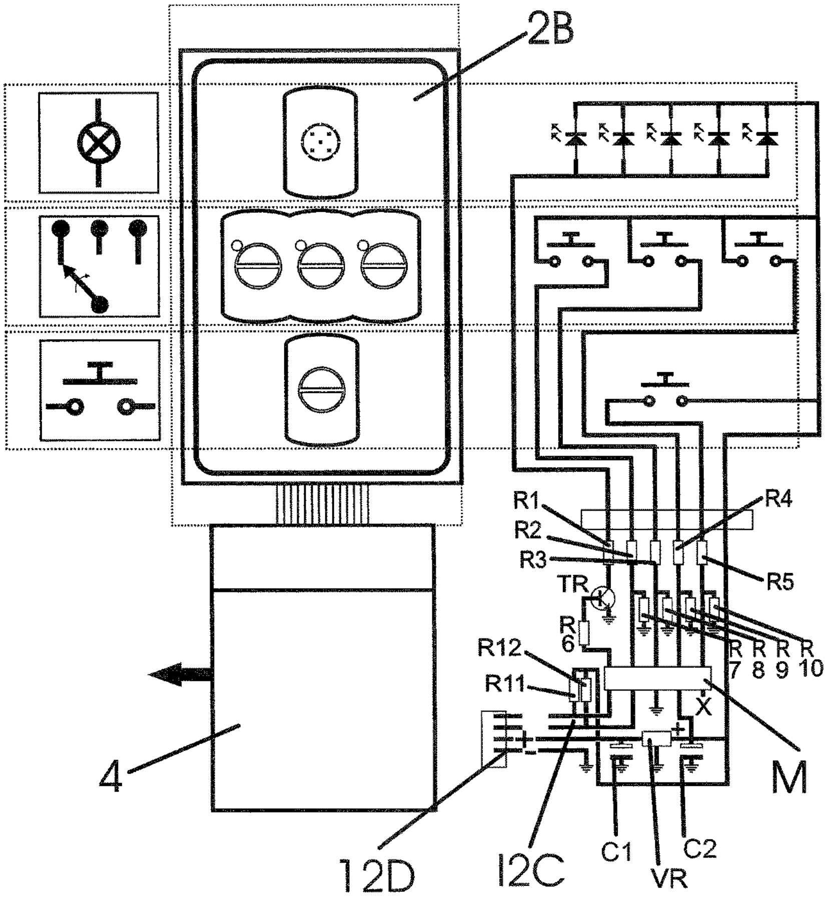
FIG. 12 is the membrane and the SLAVE module electro-electronic diagram according to an embodiment of the present invention.

Therefore, according to an embodiment of the invention, and to FIG. 12, the SLAVE (4) receives through the connector (CON1) the feeding, two communication ways (I2C) and a spare wire (12D). Accordingly, the data processing is accomplished through a micro-controller (M) fed by the set of components (C1, C2) (Electrolytic capacitors and voltage regulator) connected to VSS and VDD pins. Communication is accomplished through the interface (I2C) with SDA pins (Serial DAta) and SCL (Serial CLock). The pins that require two resistors in their connection lines (R11,R12) are connected to the positive pole and keeping them in Pull-Up.

The membrane (2B) has a positive common way through the connector (CON2), while resistors (R2, R3, R4 and R5) provide to the micro-controller (M) the return of this positive supply when a membrane button interconnected by high impedance resistors (R7, R8, R9 and R10), which are pressed connected to negative voltage to avoid signals fluctuation when buttons are at rest.

To feed and drive the LEDs, the micro-controller (M) sends a positive signal through the resistor (R6) that saturates a transistor base (general use TR—NPN) which works as an electronic key and starts to supply negative voltage to the LEDs on the membrane through the resistor (R1).

In FIG. 13, the electric diagram of the MASTER module (6) is shown. According to the diagram, through the contact terminals, the MASTER module (6) is fed with a rectified and stabilized voltage, firstly passing through a FUSE to protect against short circuits and/or overload. The MASTER module (6) counts on positive inputs and outputs corresponding to the design to be defined by the designer.

Similar to the SLAVE module (4), the data processing in the MASTER module (6) is accomplished through a micro-controller (M1) with positive supply by the set of components D6 (rectifying diode) that impedes inverted connection of supply, passing through capacitor C1 (electrolytic capacitor) and VR 1 (voltage regulator), providing source to capacitors C2, C3 (electrolytic capacitors) and VR2 (voltage regulator) connected to VSS and VDD pins. Through a connector (CON1), the MASTER module (6) provides positive supply through VR1 (voltage regulator) to the SLAVE module, as well as 2 (two) communication ways (I2C) and one spare wire.

According to an embodiment of the invention, communication with the SLAVE module (4) is made through the interface (I2C) with SDA (Serial DAta) and SCL (Serial Clock) pins. The input terminals (IN1,1N2,IN3,IN4 and IN5) pass through resistors (R6,R7,R8,R9,R10,R11,R12, R13,R14 and R15) in pairs as voltage divisors against the negative voltage in order to meet the micro-controller (M1) pins input voltage limit.

For outlets, the micro-controller (M1) sends positive signals in resistors (R1,R2,R3,R4 and R5) that saturate the transistors base (T1,T2,T3,T4 and T5—general use NPN), sending negative voltage to the relays coils (RL1,RL2,RL3, RL4 and RL5—N.A) since the other coil pole is on the VR1 (voltage regulator) supply line. Diodes (D1, D2, D3, D4 and D5) disengage relays coils when they are disconnected.

With their contacts closed, the relays transport the positive voltage post-fuse to the output terminals (OUT1, OUT2, OUT3, OUT4 and OUT5).

Figure 14:
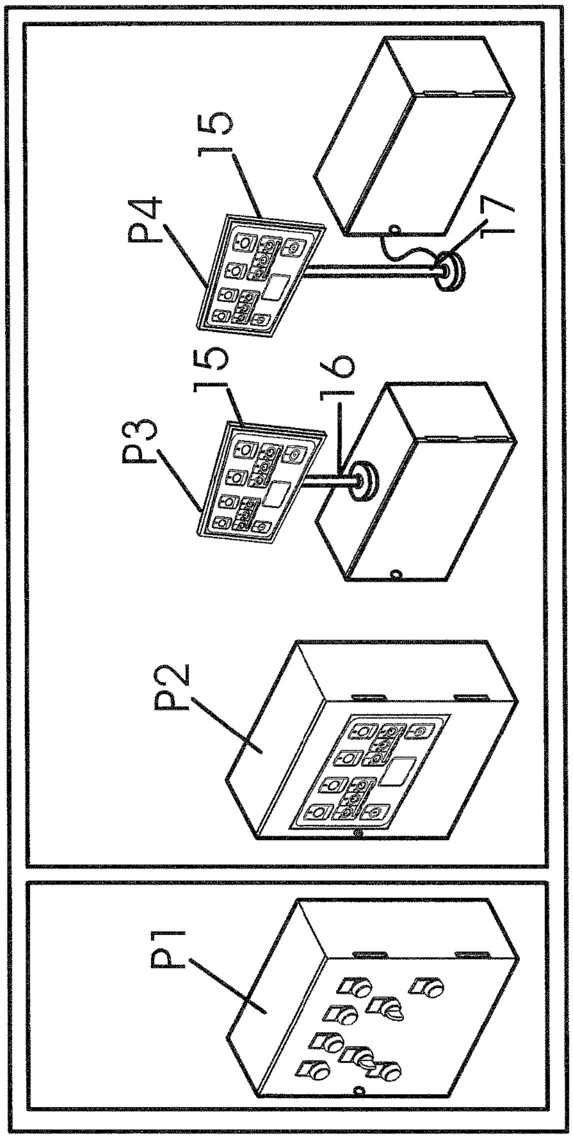
FIG. 14 shows the comparison between a conventional electric control board and an assembly casing using the electric control board according to an embodiment of the present invention.

FIG. 14 shows, on the left, a traditional electric control board (P1) (according to electric configuration in FIG. 3) and, on the right, a board (P2) with the assembly casing and electric control board according to an embodiment of the invention, which is provided several advantages. For example, uncompromised installation, reduction in materials and labor used, and time saving during assembly. According to an embodiment of the invention, new configurations to these same boards can be created using the membrane, with remote drivers.

Additionally, FIG. 14, on the right, shows the control board (P3) with the membrane glued to a metal sheet (15), separated from the casing and interconnected by a pipe (16) through where the cable for connection between the MASTER module (6) (FIG. 13) and the SLAVE module (4) passes (FIG. 11). Since the controls do not occupy physical area on the casing door, it can be smaller, thus reducing its cost.

In FIG. 14, on the right, another configuration is displayed where the board (P4) shows the membrane glued, for example, on a metal sheet (15) secured by a rod (17) and remotely connected (cable) to the casing.

Figure 15:
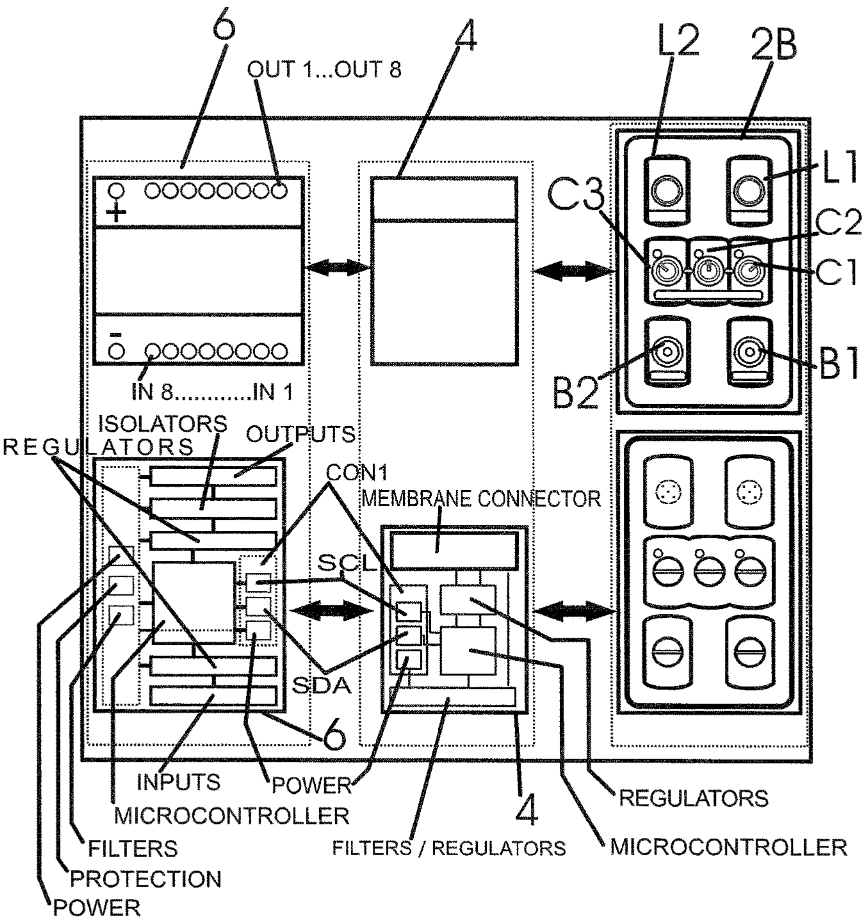
FIG. 15 shows the basic modules of the set that form the control board drivers with the polycarbonate membrane according to an embodiment of the present invention.

FIG. 15 shows basic modules of the set according to the embodiment of the present invention. The modules comprise a membrane (2B) with two signals (L1, L2), a single switch with three positions (C1, C2, C3) and two N.A buttons, a single SLAVE module (4) and a single MASTER module (6) equipped with eight inputs and eight outputs.

Figure 16:
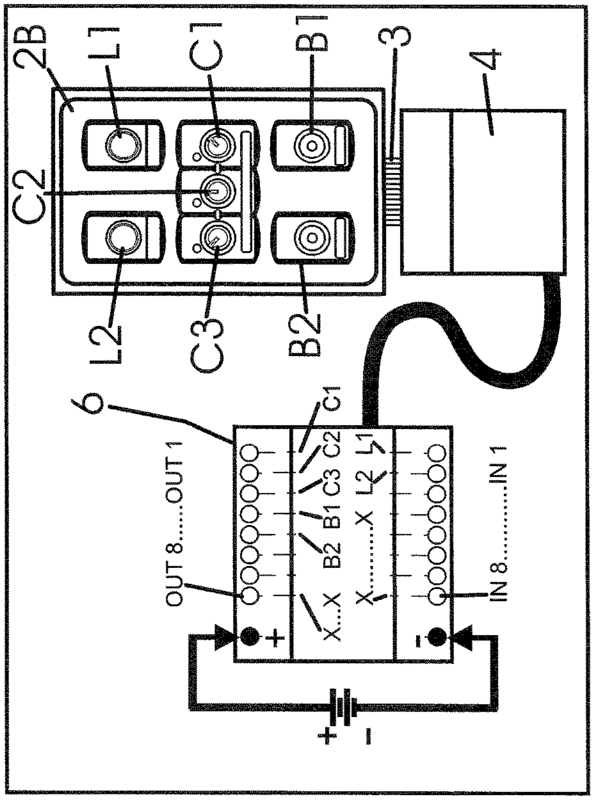
FIG. 16 is a power supply to MASTER module with a rectified source that energizes the SLAVE module and it starts to monitor the polycarbonate membrane buttons according to an embodiment of the present invention.
Figure 17:
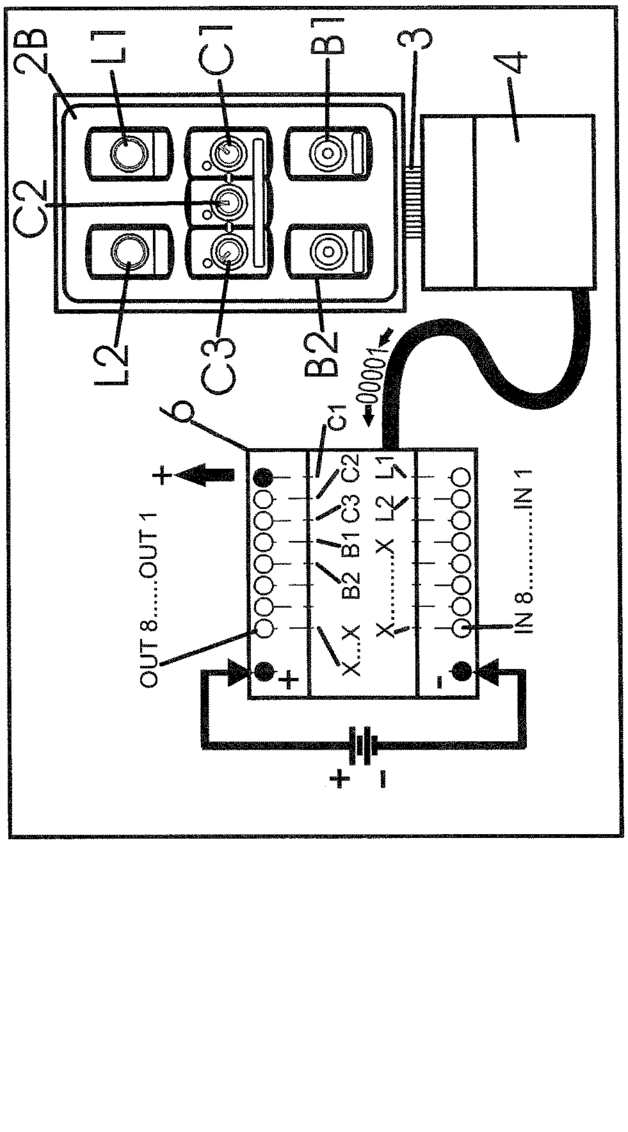
FIG. 17 shows the MASTER module after operations driving the corresponding output according to an embodiment of the present invention.

First, the MASTER module (6) is supplied with a positive rectified source that will energize the SLAVE module (4) which will start to monitor the polycarbonate membrane buttons (2B), as shown in FIG. 16. Subsequently, the SLAVE module (4) screens the keyboard and informs the MASTER module (6) via its interface (I2C) about the existence of a switch on the membrane and defines its initial position (C1). The MASTER module (6) in its turn drives the corresponding output (OUT 1), as shown in FIG. 17.

Figure 18:
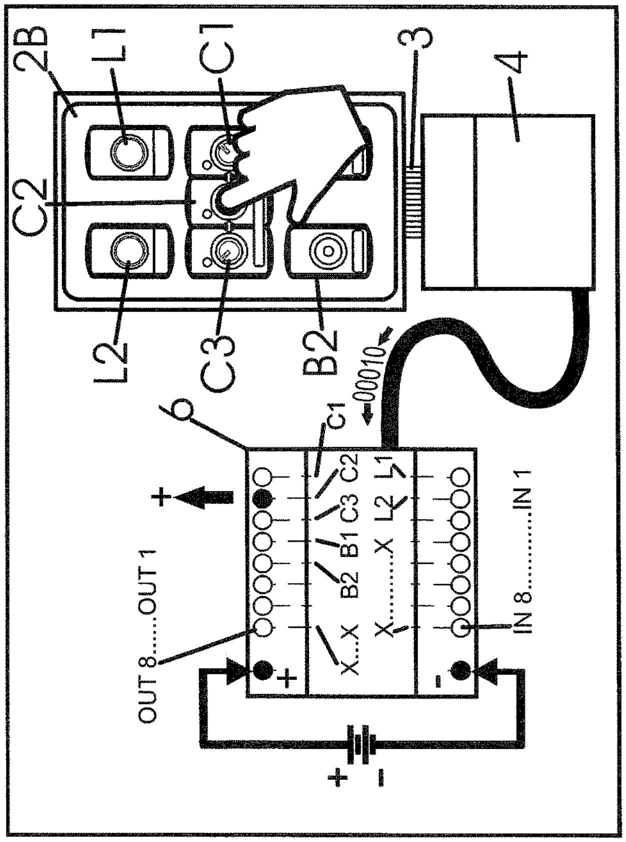
FIG. 18 shows the driving of the button, wherein the MASTER module commutes the output passing from N.A to N.F, commutes the output from N.F to N.A and keeps the output in N.A remaining in this position until there is a new interaction according to an embodiment of the present invention.
Figure 19:
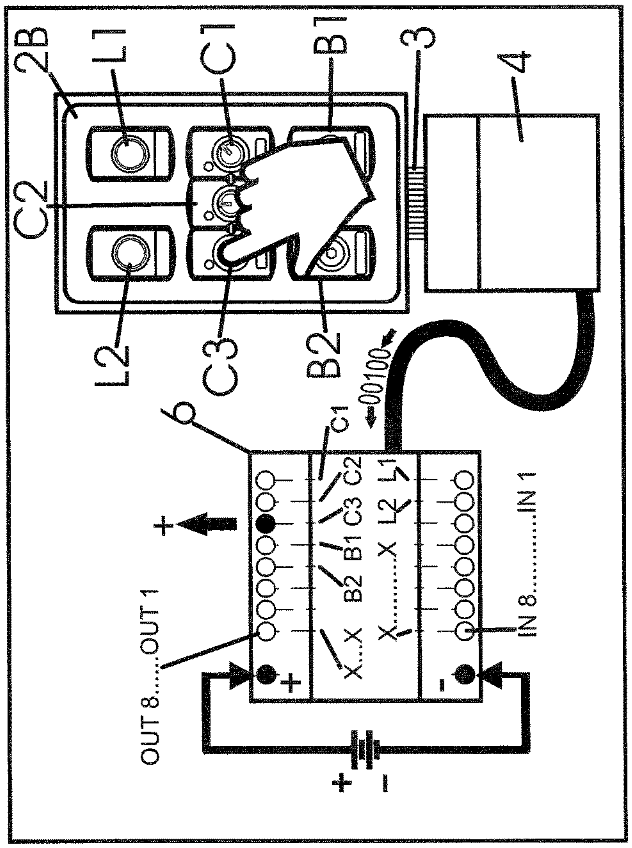
FIG. 19 shows the button driving on the membrane that makes the MASTER module commute the output according to an embodiment of the present invention.

As shown in FIG. 18, the modules wait for the user interaction. A new interaction is simulated on the membrane switch where the button driven (C2), which makes the MASTER module (6) commutate the output (OUT2) from N.A to N.F, commutate the output (OUT1) from N.F to N.A and keep the output (OUT3) in N.A remaining in this position until another interaction occurs. The same principle applies, as shown in FIG. 19, by pressing button "C3" on the membrane that will make the MASTER module (6) commutate the output (OUT3) from N.A to N.F, commutate the output (OUT2) from N.F to N.A and keep the output (OUT1) in N.A, again remaining in this position until another interaction occurs.

Figure 20:
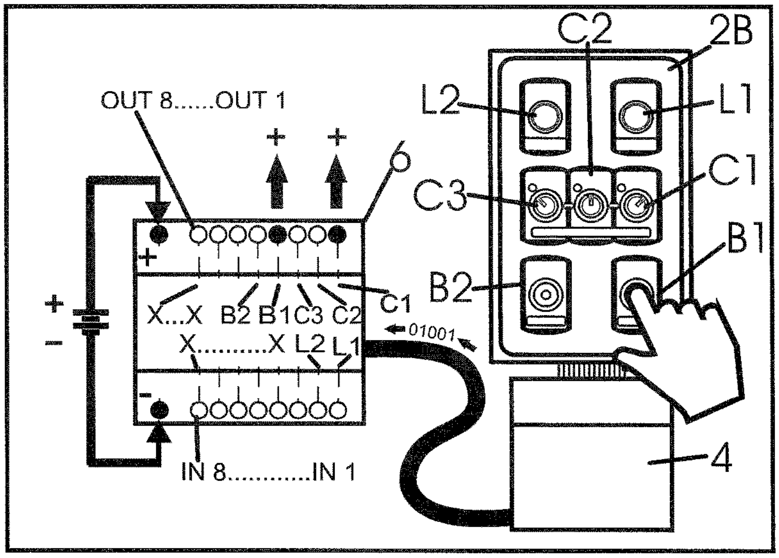
FIG. 20 shows the functioning of pushbuttons, similar to that of the switch according to an embodiment of the present invention.
Figure 21:
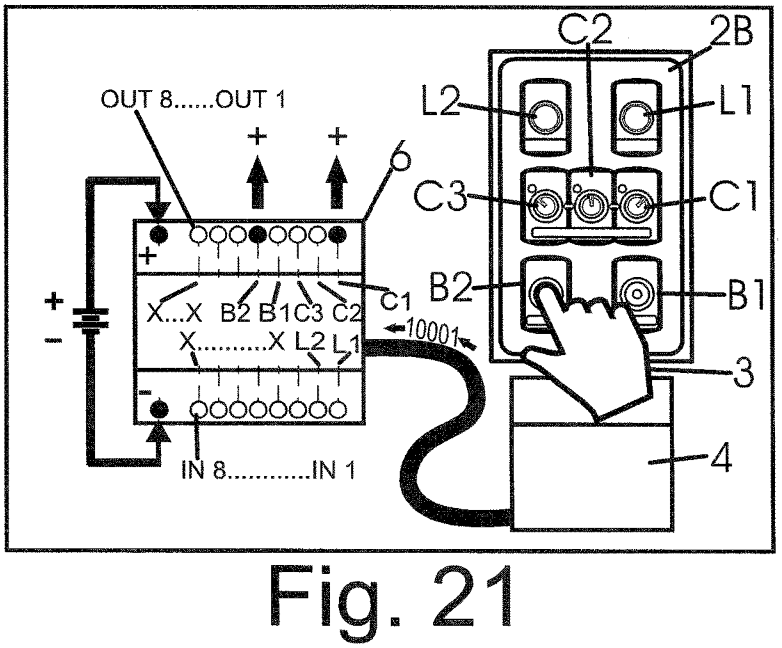
FIG. 21 shows the functioning of pushbuttons according to an embodiment of the present invention, similar to that of a switch, distinguished only because the MASTER outputs commutes from N.A to N.F only when the button is pressed; when it is released, it returns to the natural state N.A.

The pushbuttons operation (B1,B2), as shown in FIGS. 20 and 21, is similar to that of the switch. The only difference is that the MASTER outputs (6) commutates from N.A to N.F only when the button is being pressed. Therefore, when the button is released, the output returns to its natural state N.A. (OUT4—FIG. 20) and (OUT 5—FIG. 21); and OUT 1—switch output must be always in a driven position, in this case (C1).

Figure 22:
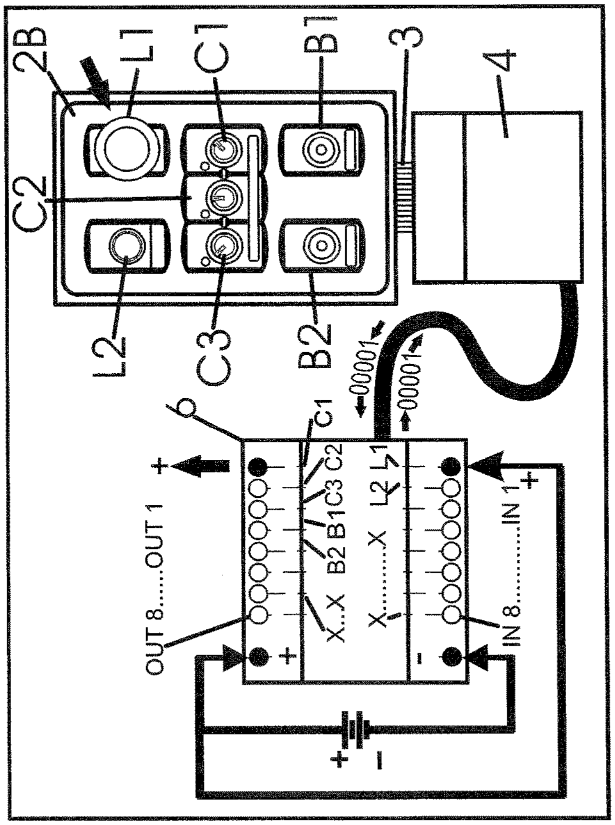
FIG. 22 shows the signal driving (L1) in inverse logics, that is, injecting a positive sign into the input (IN1) in the MASTER module, with this sending data to the SLAVE that makes the signal driving on the polycarbonate membrane according to an embodiment of the present invention.
Figure 23:
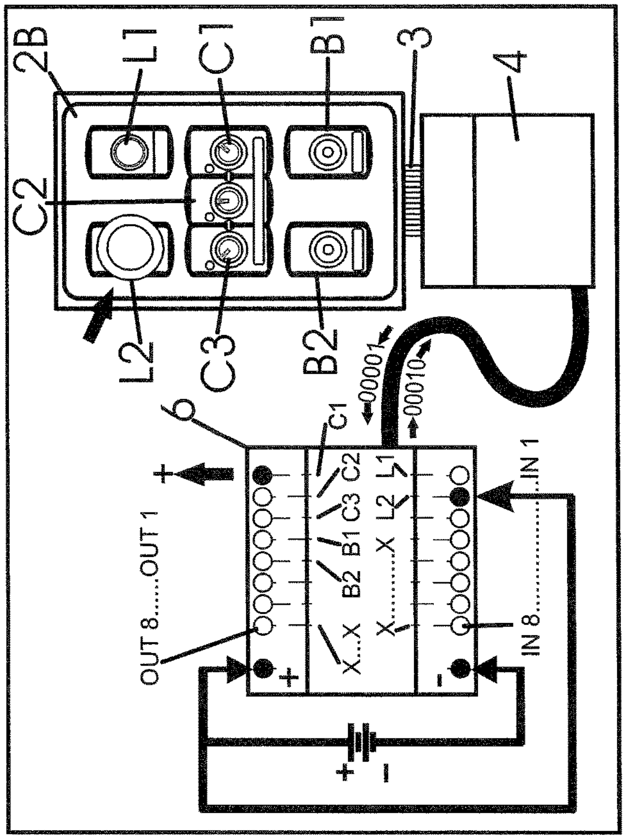
FIG. 23 shows the signal driving in inverse logics according to an embodiment of the present invention.

For driving signals (L1) and (L2), as shown in FIGS. 22 and 23, the logic is inverse, that is, a positive signal must be injected in inputs "IN 1" and "IN 2" in the MASTER module (6), so, the MASTER (6) sends data to the SLAVE (4) that drives these signals on the polycarbonate membrane.

The membrane (2B) relation with MASTER (6) and SLAVE (4) modules is determined by the volume of drivers in the design and, as shown, the operation of each driver is differentiated. We show next the amount of I/O (inputs and outputs) of each component (drivers).

Figure 24:
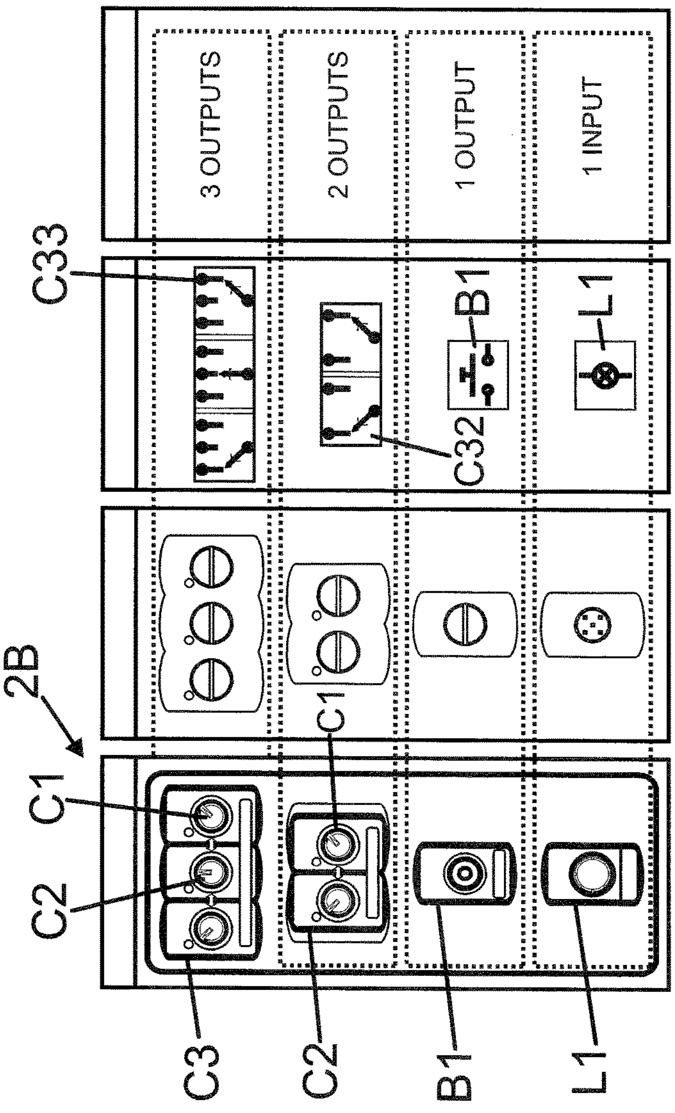
FIG. 24 shows input and output components according to an embodiment of the present invention.

FIG. 24 shows the full list of each input and output a component (driver) consumes with regard to the MASTER module. One switch with three positions (C33) consumes three output terminals of the MASTER module, one switch with two positions (C32) consumes two output terminals, one button (B1) consumes only one output terminal and one lamp (L1) consumes one input on the MASTER module terminal.

As demonstrated above, the MASTER module inputs serve sole and exclusively to drive the signals (L1) of the polycarbonate membrane (2B) and the outputs can be defined as selectors of three (C33) and two (C32) positions or simply one button (B1).

Figure 25:
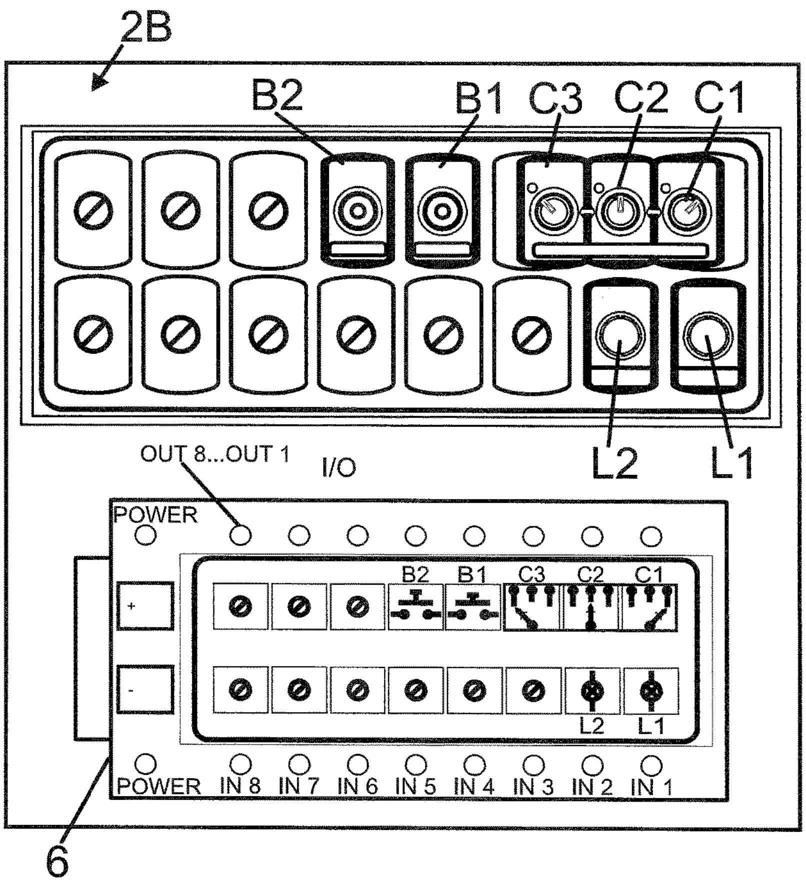
FIG. 25 shows a parallel between the components used in the drivers according to an embodiment of the present invention.

FIG. 25 shows an analogy among components used in the design exemplified in FIG. 16. The upper image demonstrates the amount of components to be used and their respective housings (terminals) in the MASTER module (6) (lower image). The three-position switch (C1, C2, C3) occupies outputs OUT1, OUT2 and OUT3 respectively, button B1 occupies output OUT4 and button B2 occupies output OUT5. The lamp L1, on the other hand, occupies input IN1 and L2 occupies input IN2. The disposition shows the use of a MASTER module (6) with capacity higher than the membrane (2B) would require. Accordingly, the fact that I/O is left unused in the MASTER (6) module does not represent a problem. However, the inverse cannot occur, because in case there are more components (drivers) on the membrane than I/O (input/output) in the MASTER module (6), one of the components will not be driven. In this case, a MASTER module (6) with more capacity must be introduced in the design.

Figure 26:
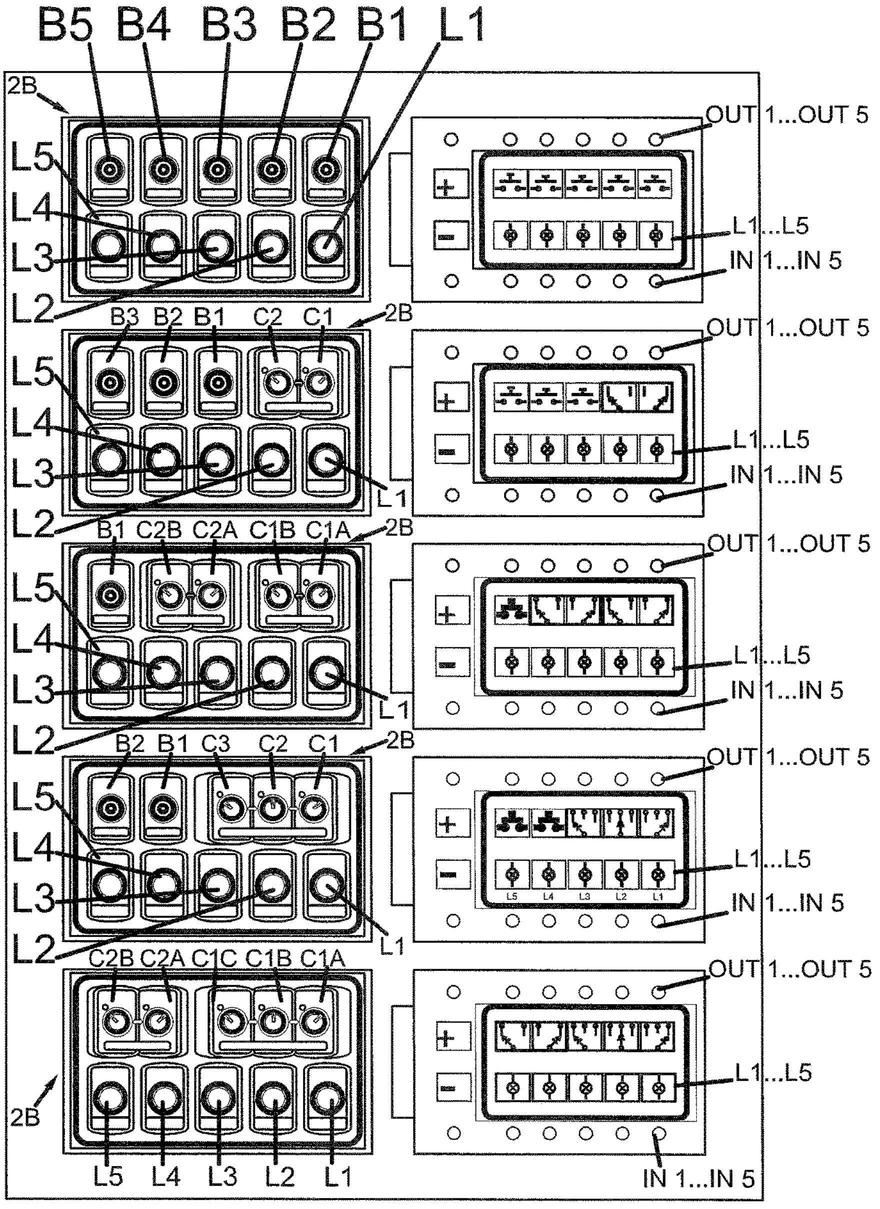
FIG. 26 shows the configurations of components on membranes according to an embodiment of the present invention.

FIG. 26 shows several examples of different configurations of components (drivers) on membranes (2B), using all I/O (input/output) of a MASTER module (6) with five inputs and five outputs. Other configurations can be obtained that leave I/O unused.

Figure 27:
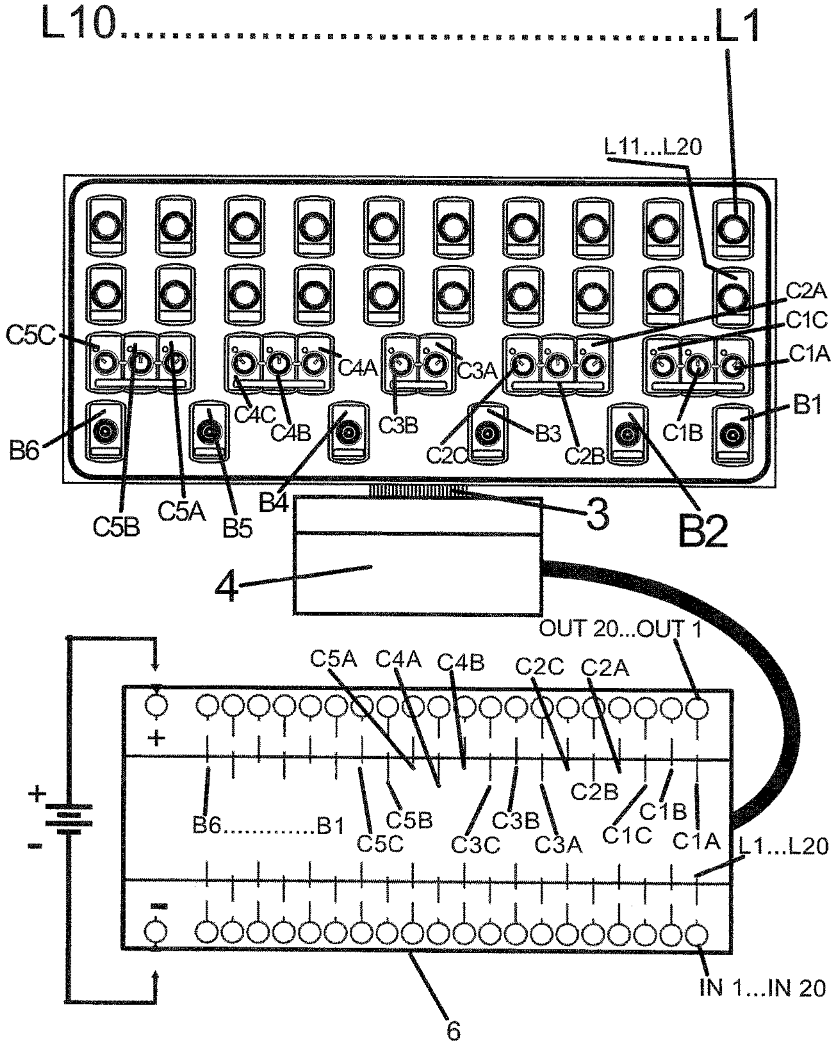
FIG. 27 shows a solid membrane panel according to an embodiment of the present invention.

FIG. 27 shows an example with a more solid membrane board, equipped with twenty visual signals (L1-L20), four switches with three positions, one switch with two positions (C1A,B,C-C2A,B,C-C3A,B-C4A,B,C-C5A,B,C) and six pushbuttons N.A. (B1-B6). According to FIG. 27, to control the membrane there is a SLAVE module (4) with capacity corresponding to the number of buttons and LEDs. The communication is still a single cable with five ways and one MASTER module (6) with capacity for twenty inputs (IN1-IN20) and twenty outputs (OUT1-OUT20), and with twenty signals (L1-L20). The only difference among designs is the I/O (inputs and outputs) capacity of the SLAVE (4) and the MASTER (6) modules that must be considered to obtain a perfect operation.

Figure 1:
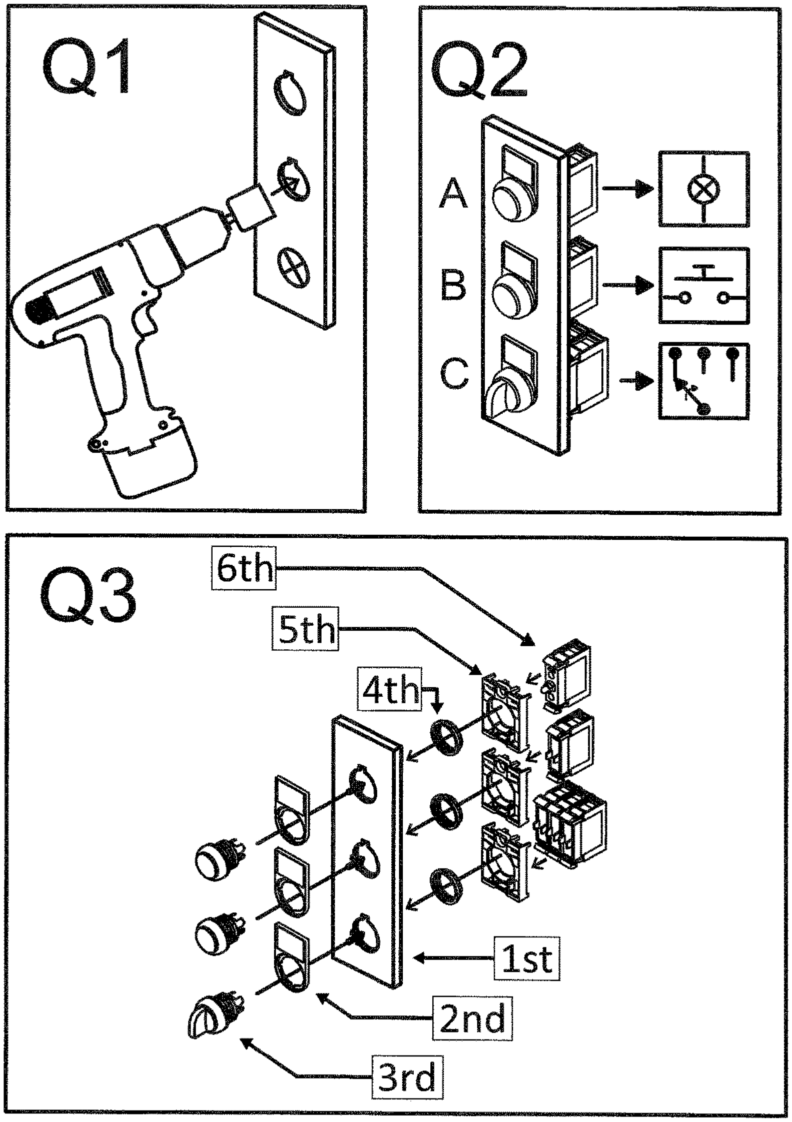
Fig. 1 PRIOR ART
FIG. 1 is a set of drivers and electric connections according to a conventional system.
Figure 2:
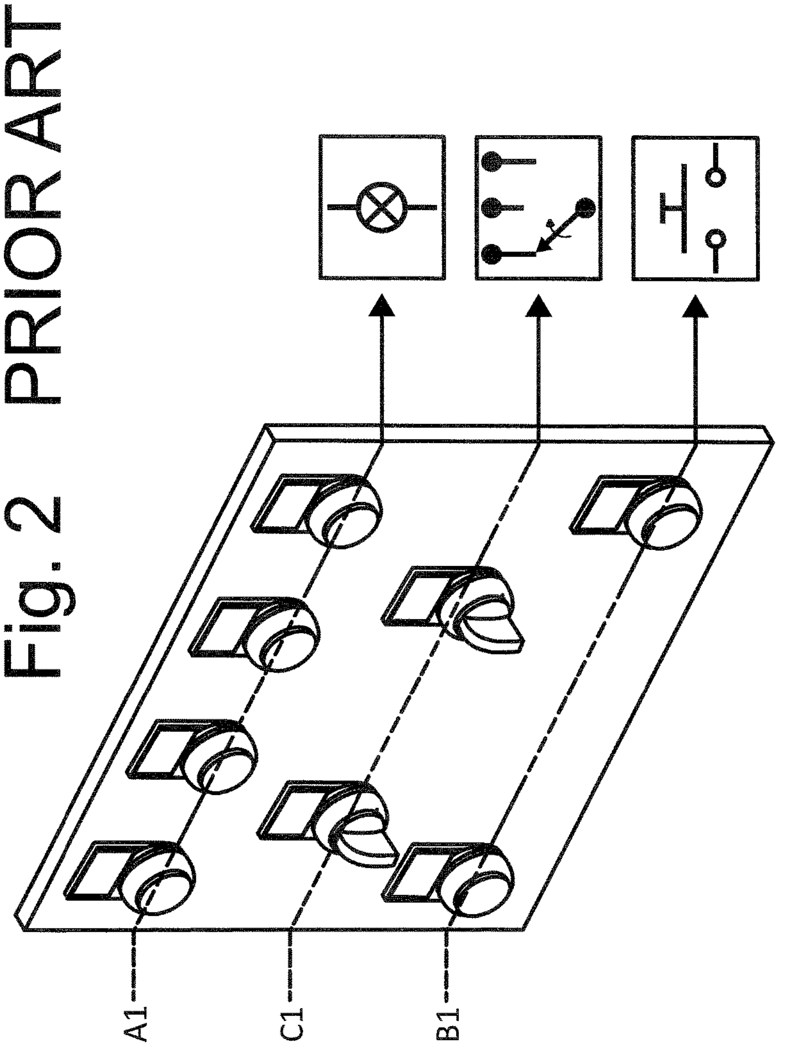
Fig. 2 PRIOR ART
FIG. 2 is a control board equipped with eight drivers according to a conventional system.
Figure 3:
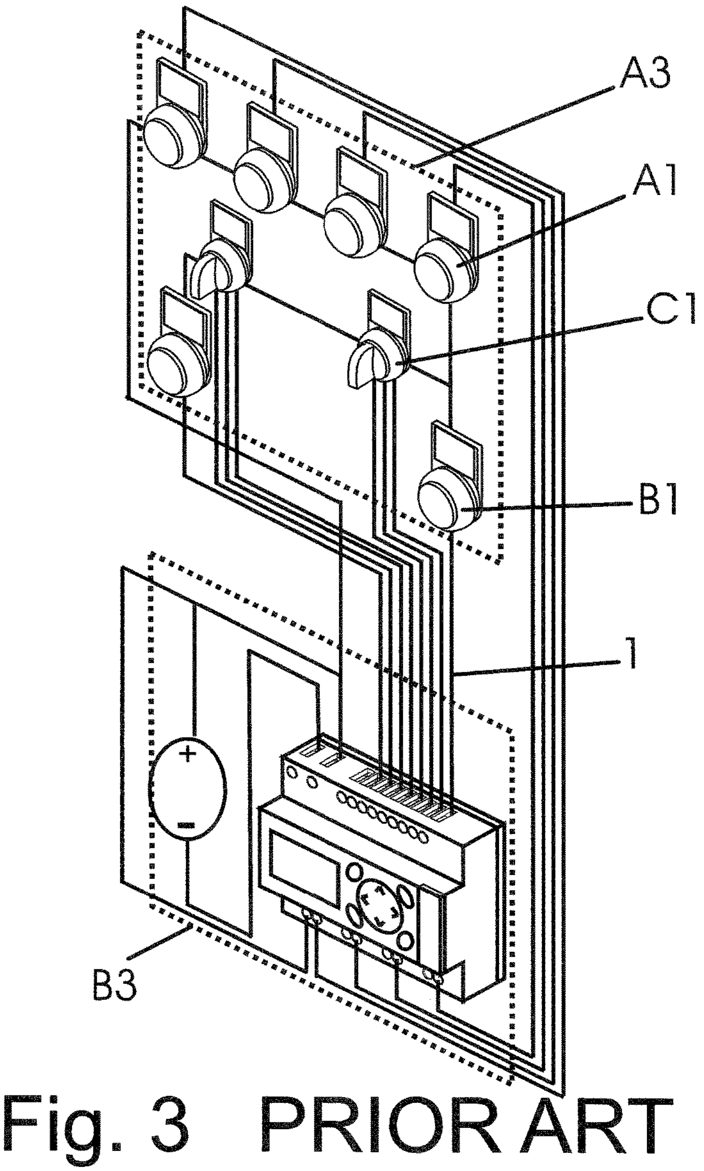
Fig. 3 PRIOR ART
FIG. 3 is the control board shown in FIG. 2 intercalated by a Programmable Logic Controller (PLC)
Figure 4:
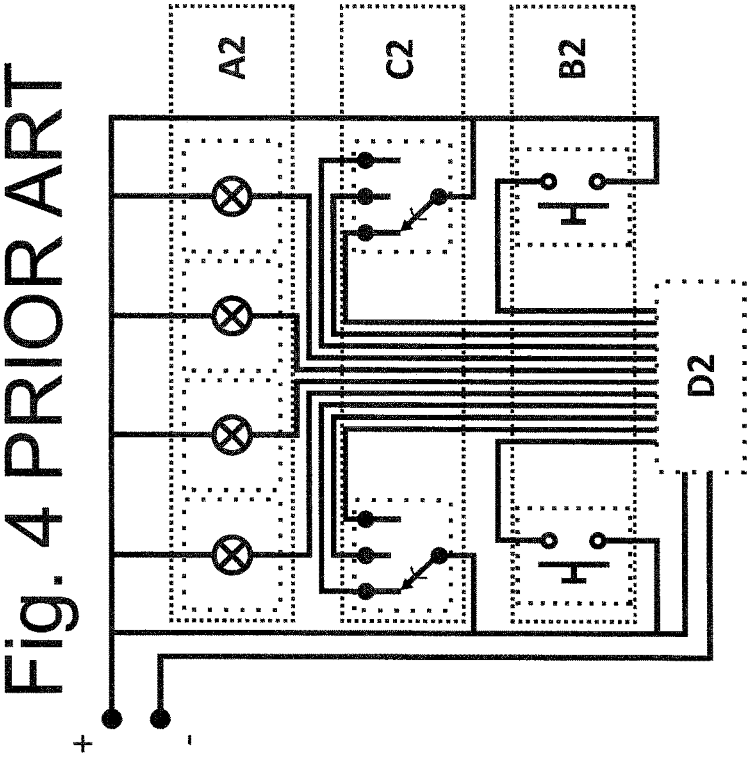
Fig. 4 PRIOR ART
FIG. 4 is a simplified electric representation wherein signals, pushbuttons and switches are connected to a PLC according to a conventional system.
Figure 5:
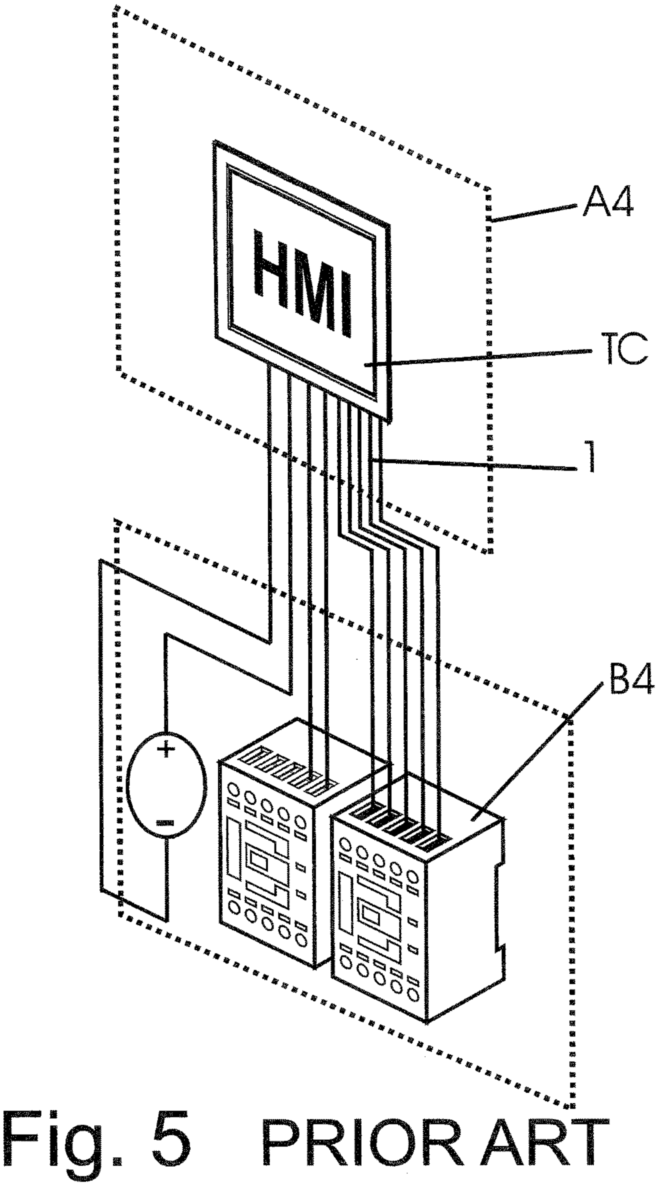
Fig. 5 PRIOR ART
FIG. 5 shows a method for connection of electric panels via Human-Machine Interface (HMI) which replaces electric drivers.
Figure 28:
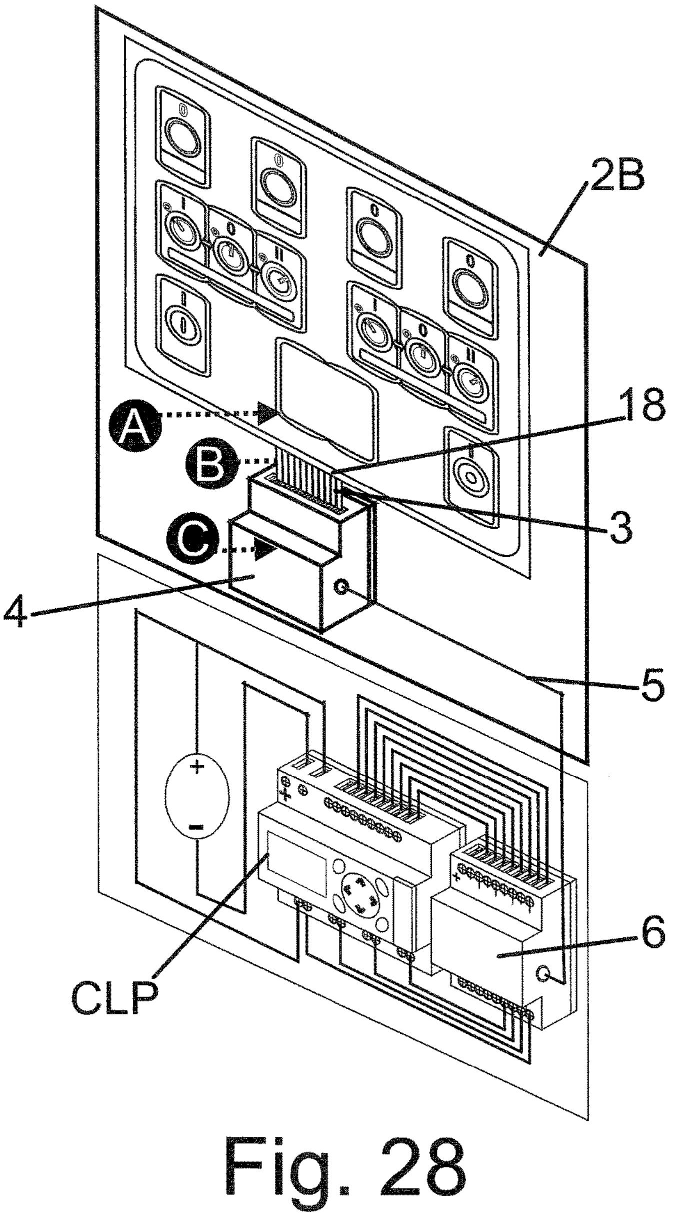
FIG. 28 shows a single cut for the FLET passage, which connects the external membrane, comprising all of the drivers with the SLAVE module located at the lower portion of the panel door according to an embodiment of the present invention.

FIG. 28 shows a system according to an embodiment of the invention, which can be compared to FIG. 3 that shows the conventional construction. In FIG. 3, there is a need to make holes in order to place the drivers, while in configuration according to FIG. 28, only one cut (18) is required to pass "FLET" (3) which connects the external membrane with all drivers with the SLAVE module (4) located at the lower portion of the board door, that is in turn connected to the MASTER module (6). The electric connection of the components in FIG. 3, on the other hand, is replaced by a single cable (5). With the respect to the connection inside the electric control board in FIG. 3, only one PLC is used to connect the board drivers. In FIG. 28, the invent was intercalated with one PLC, however, it can be dismissed when the design does not need computer processing, or when only simple control logics are required, possible to effect through drivers' electric structures by interconnecting outputs in inputs.

In terms of the operating flow, the invention comprises two modules, each one with a micro-controller, respectively, the MASTER (6) and the SLAVE (4) modules. The MASTER module is represented in FIG. 29 and the SLAVE module in FIG. 30.

Figure 29:
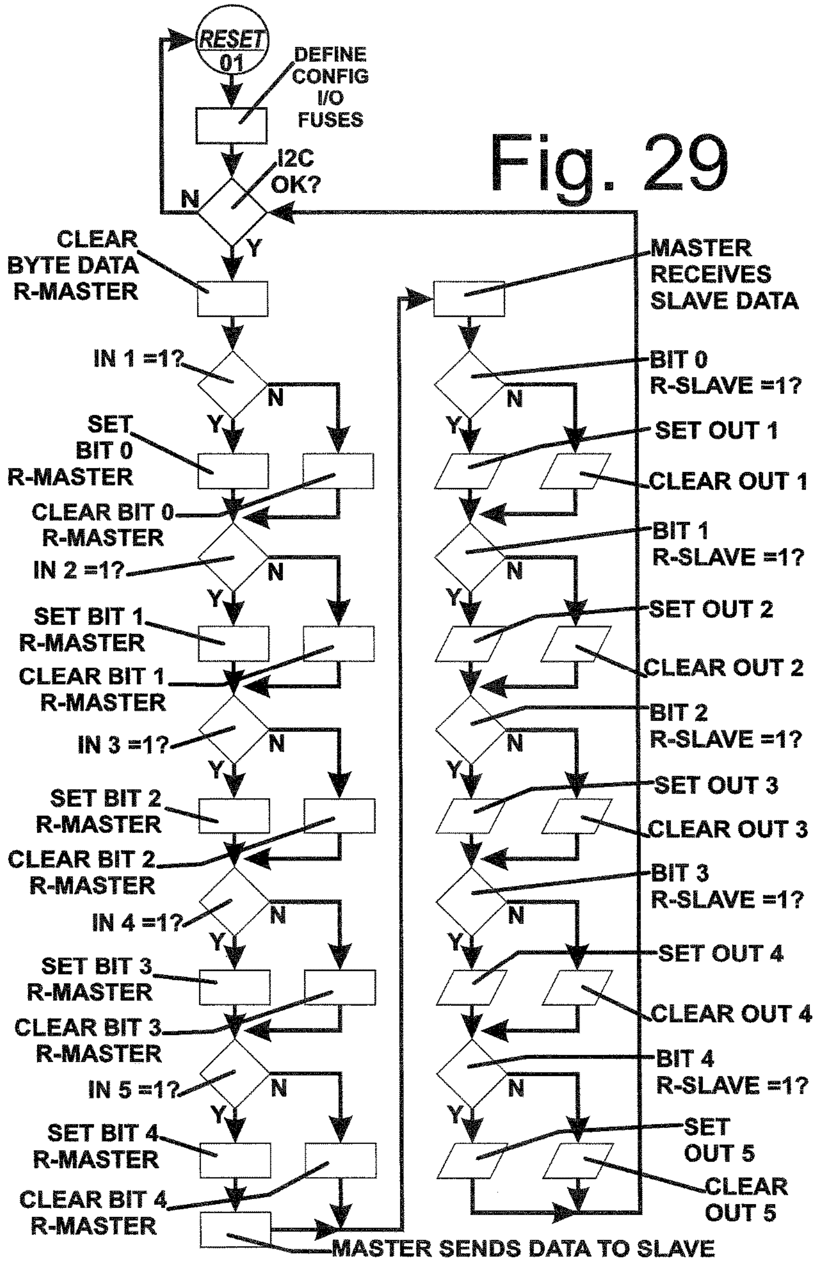
FIG. 29 shows the MASTER module flow chart according to an embodiment of the present invention.
Figure 30:
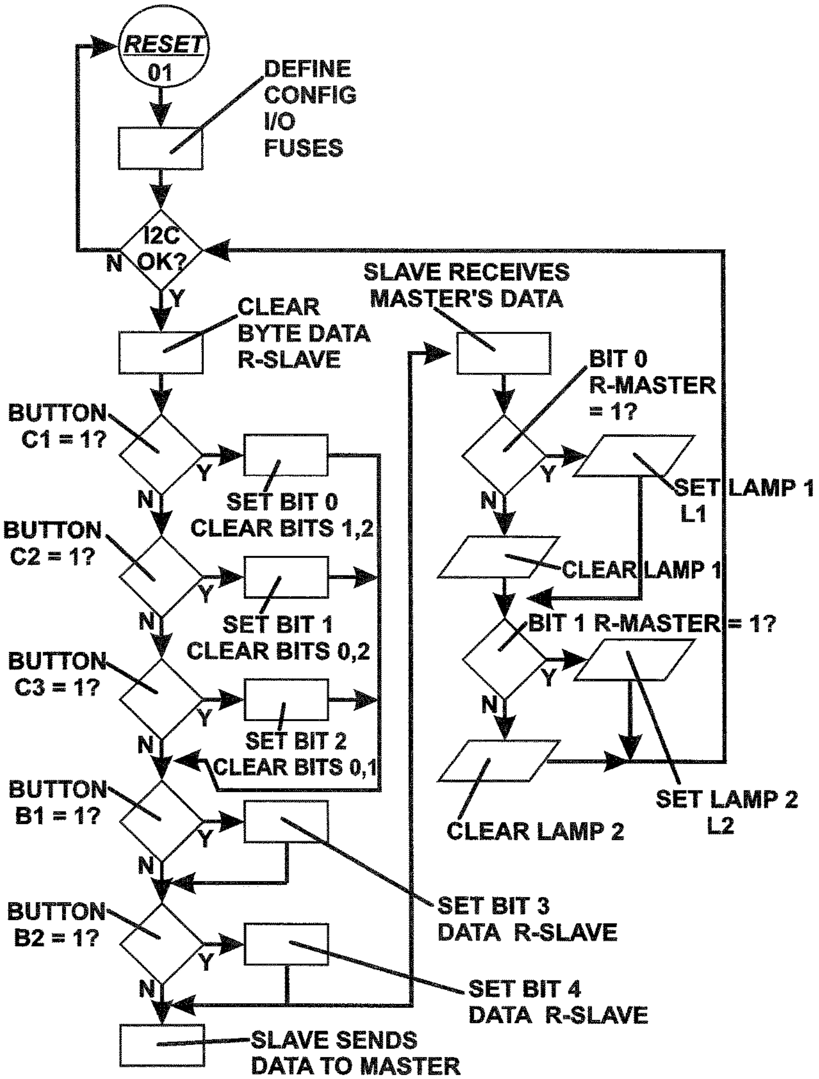
FIG. 30: shows the SLAVE module flow chart according to an embodiment of the present invention.

According to FIG. 29, to configure drivers in FIG. 16, where the membrane has one switch with three positions (C1, C2 and C3), two N.A buttons (B1 and B2) and two signals (L1 and L2), it will require the MASTER module (6) with five inputs (IN1, IN2, IN3, IN4 and IN5) and five outputs (OUT1, OUT2, OUT3, OUT4 and OUT5). In FIG. 30, the SLAVE module (4) has driving characteristics compatible with the MASTER module (6), for configuration of drivers in FIG. 16.

For communication between the MASTER and the SLAVE modules, five bits of the first protocol byte (I2C) can be used. This protocol is bidirectional, which means that when the MASTER module sends (transmits) a bit to the SLAVE module, it will receive one bit at the same time, so the communication between the modules is simultaneous.

FIG. 29 shows the MASTER module flow chart. After being energized, the micro-controller starts its software with internal configurations (it varies depending on the micro-controller), the protocol (I2C) starts, and only after having received the required and successful confirmations between the modules it goes to the main routine.

The MASTER module micro-controller's priority is the screening of the five input doors denominated as follows: IN1=bit 0, IN2=bit 1 IN3=bit 2 IN4=bit 3 and IN5=bit four of variables "R-"MASTER"=000YYYYY" where Y is the denomination of an undefined value (0—negative or 1—positive) of variable "R-"MASTER".

At first the recorder "R-"MASTER"" is cleaned (place zero), therefore R-"MASTER"=00000000, and later input tests start, beginning with IN1, if positive, the "R-"MASTER"" starts to present the following value: "00000001", otherwise the 0 bit is kept in 0 (zero): 00000000, and so on, all inputs test is made (N2, N3, N4 and N5) keeping tests' results in the "R-"MASTER"" recorder.

After concluding the input screening, the MASTER module makes the exchange of data with the SLAVE module, sending the values obtained in the "R-"MASTER" recorder and receiving the values of the "R-"SLAVE"=XXXXXXXX" recorder simultaneously, where X is the denomination of an undefined value (0—negative or 1—positive) of variable "R-"SLAVE". After exchanging data between modules, the tests of byte received start; driving the corresponding outputs, first the bit0 of "R-"SLAVE" recorder is tested and in positive case, ARROW (place one) the "OUT1" output, otherwise, ZERO (place zero—off) the "OUT1" output and so on with all outputs until the end of the 5th bit of "R-"SLAVE"" byte. When the outputs tests and commutations are concluded, the micro-controller returns to its initial routine making an infinite looping.

FIG. 30 shows the SLAVE module flow chart. The SLAVE module micro-controller's priority is the screening of the membrane keyboard buttons inputs, denominated as follows: three position switch: C1=bit 0, C2=bit 1 and C3=bit 2, two N.A buttons: B1=bit 3 and B2=bit 4, of variable "R-"SLAVE"=000XXXXX" where X is the denomination of an undefined value (0—negative or 1—positive) of "R-"SLAVE"" variable. At first the recorder "R-"SLAVE"" is cleaned (place zero), therefore R-"SLAVE"=00000000, and later input tests start, beginning with the 3-position switch buttons, starting with C1, in case it is positive, the "R-"SLAVE" will have the following value: "00000001", where arrow (place 1) the bit0 and clean (place bits 1 and 2 in zero) for being a switch (only one output should be in 1), otherwise the bit0 is kept in 0 (zero): 00000000, followed by the C2 test, and in case it is positive place "R-"SLAVE"=00000010, arrowing bit1 and cleaning bits 0 and 2 and concluding with the C3 test which driven arrows bit2 and zeroes bits 0 and 1: R-"SLAVE"=00000100. Later, button B1 test is made and in case it is positive arrows bit 3 of R-"SLAVE"=00001XXX and concludes the keyboard tests with button B2 which, when driven (positive) arrows bit 4 of recorder R-"SLAVE"=0001XXXX.

When the screening in the membrane input is completed, the SLAVE module makes the exchange of data with the MASTER module, sending the values obtained in the "R-"SLAVE" recorder and receiving the values of recorder "R-"MASTER"=YYYYYYYY" simultaneously, where Y is the denomination of an undefined value (0—negative or 1—positive) of variable "R-"MASTER".

After exchanging data between the modules, the tests of byte received start; driving the corresponding outputs, first the bit0 of "R-"MASTER" recorder is tested and in positive case, ARROW (place one) the "L1" output, otherwise, ZERO (place zero off) the "L1" output and later makes the test of bit1 and in case it is positive, connect L2, thus concluding the tests and commutations of outputs, and the micro-controller returns to its initial routine making an infinite looping.

Optionally, the invention can associate the sheets of the SLAVE and MASTER modules in one single module, making of FLET the means of connection to the membrane.

What is claimed is:

1. A control board drivers with polycarbonate membrane, comprising:

an electric control board with drivers having an adhesive polycarbonate membrane and electronic circuits, an opening for passage of a connection FLET between the adhesive polycarbonate membrane and a SLAVE module, and a supply cable projecting from the SLAVE module wherein the supply cable includes: two data communication wires, two supply wires and one spare wire that connects the SLAVE module to a MASTER module, wherein the adhesive polycarbonate membrane further comprises an adhesive membrane with a frontal layout, a double face perforated adhesive, a flexible printed circuit membrane with contact caps, wherein the adhesive polycarbonate membrane is used to form a plurality of drivers.

2. The control board drivers with polycarbonate membrane, according to claim 1, wherein the adhesive membrane replaces all the drivers on the electric control board.

3. The control board drivers with polycarbonate membrane, according to claim 1, wherein a five-way cable replaces the supply cable.

4. The control board drivers with polycarbonate membrane, according to claim 1, wherein the adhesive membrane simulates a driver.

5. The control board drivers with polycarbonate membrane, according to claim 1, wherein the SLAVE module receives supply through a connector with two communication ways and one spare wire, and data processing is accomplished through a micro-controller supplied by a plurality of components and VR (voltage regulator) connected to Voltage Source Source (VSS) and Voltage Drain Drain (VDD) pins.

6. The control board drivers with polycarbonate membrane, according to claim 5, wherein the MASTER module communicates through an interface with SDA (Serial DAta) and SCL (Serial CLock) pins, each of the pins having two resistors in connection lines connected to a positive pole, wherein the MASTER module has a micro-controller with a supply and a plurality of rectifying diode components, a first electrolytic capacitor and a first voltage regulator, and at least two additional electrolytic capacitors and a second voltage regulator connected to VSS and VDD pins through a first connector, and wherein the MASTER module provides supply through the first voltage regulator to the SLAVE module, the two communication ways and the one spare wire.

7. The control board drivers with polycarbonate membrane, according to claim 1, wherein boards of the SLAVE module and the MASTER modules are combined in a single module, wherein the single module is connected to the adhesive polycarbonate membrane.

* * * * *